United States Patent [19]

Yokoe et al.

[11] Patent Number: 4,628,404
[45] Date of Patent: Dec. 9, 1986

[54] DIELECTRIC COMPOSITION AND LAMINATED CAPACITOR

[75] Inventors: Nobuo Yokoe; Takashi Okawa; Nobuyoshi Fujikawa; Kazuyoshi Yamashita, all of Kokubu, Japan

[73] Assignee: Kyocera Corporation, Kyoto, Japan

[21] Appl. No.: 817,517

[22] Filed: Jan. 9, 1986

[51] Int. Cl.$^4$ .................... H01G 4/10; C04B 35/46
[52] U.S. Cl. ..................... 361/321; 501/136
[58] Field of Search ............. 361/321, 328; 501/134, 501/136, 137, 138; 29/25.42; 427/79

[56] References Cited

U.S. PATENT DOCUMENTS

| | | | |
|---|---|---|---|
| 3,757,177 | 9/1973 | Buehler | 361/321 |
| 3,760,244 | 9/1973 | McClelland | 29/25.42 X |
| 4,097,911 | 6/1978 | Dorrian | 29/25.42 X |
| 4,335,216 | 6/1982 | Hodgkins et al. | 501/138 X |
| 4,485,181 | 11/1984 | Sakabe | 361/321 X |
| 4,536,821 | 8/1985 | Wheeler et al. | 361/321 |

Primary Examiner—Donald A. Griffin
Attorney, Agent, or Firm—Spensley Horn Jubas & Lubitz

[57] ABSTRACT

A dielectric ceramic composition prepared by adding 0.1 to 1.3% of $B_2O_3$, 1.0 to 3.0% of $SiO_2$ and 0.5 to 3.0% of ZnO to a composition comprising 18.0 to 27.0% of $BaTiO_2$, 31.6 to 36.3% of $Nd_2O_3$, 27.6 to 35.5% of $TiO_2$, 2.5 to 8.1% of $Bi_2O_3$ and 5.6 to 9.0% of $Pb_3O_4$, all percentages being by weight. This dielectric composition has a high dielectric constant and a temperature coefficient controlled within a narrow range and can be fired at relatively low temperatures. Because of these properties, it is used as a multilayer ceramic capacitor in combination with an electrode composed of an Ag-Pd alloy containing a major amount of Ag.

5 Claims, 1 Drawing Figure

DIELECTRIC COMPOSITION AND LAMINATED CAPACITOR

BACKGROUND OF THE INVENTION

1. Field of the Invention

This invention relates to a dielectric ceramic composition for a temperature-compensating ceramic capacitor which has a high dielectric constant and in which the temperature coefficient of its capacity can be controlled within the range of $\pm 30$ ppm $(10^{-6})$/°C. at temperatures within the range of $-55°$ to $+125°$ C. The invention also relates to a multilayer ceramic capacitor obtained by firing at relatively low temperatures a laminate of a layer of the above dielectric ceramic composition and an Ag-Pd alloy layer containing a major amount of silver.

2. Description of the Prior Art

Generally, a temperature-compensating ceramic capacitor having a high dielectric constant, particularly a commercial multilayer ceramic capacitor, is obtained by laminating a plurality of thin dielectric layers having an inner electrode formed on their surface so that the internal electrodes are alternately connected in series to electrodes for external connection, and firing the assembly. Laminated capacitors of this type require relatively high firing temperatures (at least 1240° C.) in order to make them sufficiently compact and thus give a high dielectric constant. Hence, the electrodes must be made of a metal having a higher melting point than the firing temperature of the dielectric material, such as an expensive noble metal (e.g., platinum or palladium). The cost of the metallic material thus increases the total cost of capacitors of this type.

Attempts have therefore been made to obtain multilayer ceramic capacitors of low prices by lowering the firing temperature for the dielectric material and the internal electrodes, and using inexpensive Pd-Ag alloys particularly having a major amount of Ag instead of the expensive noble metals. It is known however that generally, the crystallinity of a dielectric decreases with decreasing firing temperature, and therefore, its dielectric constant decreases. When the firing is carried out at lower temperatures than the aforesaid firing temperature, sufficient electrical properties and temperature characteristics for a high dielectric ceramic capacitor cannot be obtained.

Japanese Laid-Open Patent Publication No. 170405/1982 states that by adding moderate amounts of ZnO and $SiO_2$ to a composition comprising $Nd_2TiO_7$, $BaTiO_3$, $TiO_2$, $Bi_2O_3$ and $Pb_3O_4$, the resulting composition can be fired at 1050° to 1100° C. to obtain a sintered body, and in the production of a laminated capacitor in which the baking of the internal electrodes and the firing of the ceramic composition must be simultaneously carried out, a low-melting inexpensive Ag-Pd alloy can be used as the internal electrodes. This prior technique, however, has the defect that the temperature coefficient of the electrostatic capacity is within a relatively broad range of $+30$ to $-300$ ppm/°C., the insulation resistance is reduced, or the breakdown voltage is low and varies greatly.

SUMMARY OF THE INVENTION

It has now been found in accordance with this invention that when specified proportions of $B_2O_3$, $SiO_2$ and ZnO are added to a major proportion of a composition comprising $BaTiO_3$ having high crystallinity synthesized in advance at a sufficiently high temperature (e.g., 1200° C.), $Nd_2O_3$, $TiO_3$, $Bi_2O_3$ and $Pb_3O_4$, the major composition can be fully compacted at a temperature of 1000° to 1050° C. because an amorphous liquid phase forms at a temperature below the temperature at which the ceramic is sintered and this liquid phase promotes the sintering of the ceramic. As a result, the temperature coefficient of the electrostatic capacity can be controlled within a narrow range of $\pm 30$ ppm/°C., and stable temperature characteristics can be obtained. Furthermore, there is little decrease in insulation resistance. The breakdown voltage is not appreciably decreased, and its variations are little. When the above starting mixture is fired at lower temperatures of 1000° to 1050° C., a temperature compensating ceramic capacitor having a high dielectric constant can be obtained as in the case of firing at high temperatures.

It is an object of this invention to provide a dielectric ceramic composition form which a dielectric ceramic capacitor having an electrostatic capacity temperature coefficient of $\pm 30$ ppm/°C., a high dielectric constant (dielectric constant $\epsilon_r$ 50), a high insulation resistance (IR $10^6$ M-ohms), a high breakdown voltage with little variations can be produced at low cost at lower firing temperatures than in the prior art using an inexpensive Pd-Ag alloy particularly having a major amount of Ag.

According to the present invention, there is first provided a dielectric ceramic composition prepared by adding 0.1 to 1.3% by weight, preferably 0.3 to 0.9% by weight, of $B_2O_3$, 1.0 to 3.0% by weight, preferably 1.5 to 2.5% by weight, of $SiO_2$ and 0.5 to 3.0% by weight, preferably 1.0 to 2.5% by weight, of ZnO to a major proportion of a composition comprising 18.0 to 27.0% by weight of $BaTiO_3$, 31.6 to 36.3% by weight of $Nd_2O_3$, 27.6 to 35.5% by weight of $TiO_2$, 2.5 to 8.1% by weight of $Bi_2O_3$ and 5.6 to 9.0% by weight of $Pb_3O_4$.

According to this invention, there is also provided a multilayer dielectric ceramic capacitor comprising (a) a laminated monolithick structure obtained by preparing a plurality of units each consisting of a thin layer of a dielectric ceramic composition and a thin layer of a metal paste formed as an internal electrode on the surface of the ceramic layer so that it reaches one end of the ceramic layer but does not reach the other end, stacking the units so that the metal paste-reaching ends of the ceramic layers and the other ends are each alternately situated on the same side, press-bonding them, and sintering the entire assembly, and (b) external electrodes provided on both sides of the laminated structure; wherein said dielectric ceramic composition is a dielectric ceramic composition prepared by adding 0.1 to 1.3% by weight of $B_2O_3$, 1.0 to 3.0% by weight of $SiO_2$ and 0.5 to 3.0% by weight of ZnO to a major proportion of a composition comprising 18.0 to 27.0% by weight of $BaTiO_3$, 31.6 to 36.3% by weight of $Nd_2O_3$, 27.6 to 35.5% of $TiO_2$, 2.5 to 8.1% by weight of $Bi_2O_3$ and 5.6 to 9.0% by weight of $Pb_3O_4$, and the internal electrode is made of a silver-palladium alloy in which silver is present in a major amount.

DETAILED DESCRIPTION OF PREFERRED EMBODIMENTS

Figure 1:
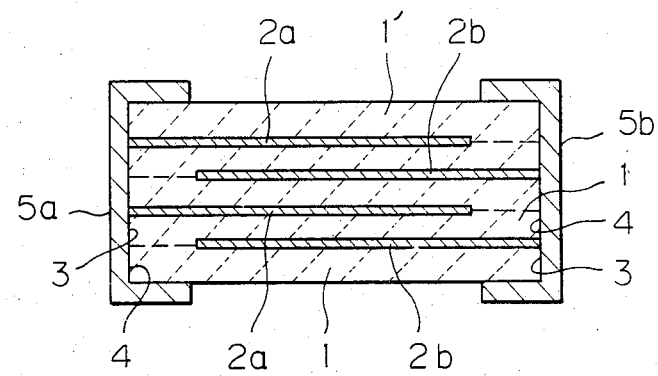
FIG. 1 is a view showing the sectional structure of one example of the multilayer dielectric ceramic capacitor of the invention.

With reference to FIG. 1, the multilayer ceramic capacitor of this invention comprises a laminated dielectric structure and a pair of external electrodes $5a$ and $5b$ fixed integrally to both sides of the laminated structure. The laminated structure is produced by preparing a plurality of units each consisting of a thin layer of dielectric ceramic 1 and formed on its surface an internal electrode $2a$ ($2b$) of a metal paste which reaches one end 2 of the ceramic layer but does not reach the other end 4 of the ceramic layer, stacking these units so that the one ends 3 and the other ends 4 are each situated alternately on the same side, laying only a dielectric layer $1'$ on the top of the assembly, press-bonding the assembly and sintering it to a monolithic body. Electrodes $2a$ are connected to the external electrodes $5a$, and electrodes $2b$, to the external electrode $5b$.

One important feature of the present invention is that the dielectric ceramic is formed from the aforesaid dielectric ceramic composition.

The reasons for limiting the quantitative ranges of the components of the ceramic composition of this invention will be given below. If the proportion of $BaTiO_3$ is below 18.0% by weight, a sufficiently compact ceramic cannot be obtained unless the firing temperature is made relatively high. On the other hand, if it exceeds 27.0% by weight, a sufficiently compact ceramic cannot be obtained unless the firing temperature is high. Furthermore, the insulation resistance (IR) of the dielectric composition becomes lower. If the proportion of $Nd_2O_3$ is less than 31.6% by weight, a sufficiently compact ceramic cannot be obtained unless the firing temperature is high. Furthermore, the insulation resistance (IR) of the dielectric composition is low, and its quality factor (Q value) tends to become small. If it exceeds 36.3% by weight, the capacity temperature coefficient (ppm/°C.) shifts greatly to the plus side. This tendency is reduced if the proportion of $BaTiO_3$ is small, but on the other hand, a sufficiently compact ceramic cannot be obtained unless the firing temperature is high. If the proportion of $TiO_2$ is less than 27.6% by weight, a sufficiently compact ceramic cannot be obtained unless the firing temperature is high. If it exceeds 35.5% by weight, the temperature coefficient of capacity (ppm/°C.) tends to become slightly larger on the minus side. If the proportion of $Bi_2O_3$ is less than 2.5% by weight, the temperature coefficient of capacity (ppm/°C.) shifts on the minus side. Furthermore, a sufficiently compact ceramic cannot be obtained unless the firing temperature is higher. Furthermore, the insulation resistance (IR) and the quality factor (Q value) of the dielectric composition become low. If it exceeds 8.1% by weight, the temperature coefficient of capacity (ppm/°C.) likewise shifts to the minus side, and the insulation resistance (IR) becomes low. If the proportion of $Pb_3O_4$ is less than 5.6% by weight, the temperature coefficient of capacity (ppm/°C.) shifts greatly to the minus side, and a sufficiently compact ceramic cannot be obtained unless the firing temperature is high. If it exceeds 9.0% by weight, the temperature coefficient of capacity (ppm/°C.) shift to the plus side.

The addition of $B_2O_3$ serves to increase the breakdown voltage of the multilayer ceramic capacitor and thus its voltage resistance. If the proportion of $B_2O_3$ is less than 0.1% by weight, the effect of increasing breakdown voltage is reduced. Moreover, a sufficiently compact ceramic cannot be obtained unless the firing temperature is high, and the insulation resistance (IR) of the dielectric composition becomes low. If it exceeds 1.3% by weight, the dielectric composition will fuse to the alumina setter during firing. If the proportion of $SiO_2$ is less than 1.0% by weight, or larger than 3.0% by weight, a sufficiently compact ceramic cannot be obtained unless the firing temperature is high. Moreover, the insulation resistance (IR) and the quality factor (Q value) of the dielectric composition become low. If the proportion of ZnO is less than 0.5% by weight, a sufficiently compact ceramic cannot be obtained unless the firing temperature is sufficiently high. Moreover, the insulation resistance (IR) and the quality factor (Q value) of the dielectric composition become low. If it exceeds 3.0% by weight, the quality factor (Q value) becomes low, and the temperature coefficient of capacity (ppm/°C.) becomes greater to the plus side.

As stated above, when the proportions of $BaTiO_3$, $Nd_2O_3$, $TiO_2$, $Bi_2O_3$, $Pb_3O_4$, $B_2O_3$, SiO and ZnO are outside the ranges specified in the present invention, either the quality factor (Q value), the insulation resistance (IR) and the breakdown voltage of the resulting dielectric composition are too low, or the sintering of the composition at low firing temperatures (1050° C. or lower) is insufficient, and therefore, the object of this invention cannot be fulfilled.

A second feature of the present invention is that since the dielectric composition can be sintered at relatively low firing temperatures, a relatively inexpensive silver-palladium alloy containing a major amount of silver can be used as a metal constituting the internal electrodes. The silver-palladium alloy used in this invention contains Ag and Pd in a weight ratio of from 51:49 to 90:10, especially from 50:40 to 80:20.

The green sheet laminate is preferably sintered at a firing temperature of 1000° to 1050° C., preferably 1030° to 1050° C.

The following examples illustrate the present invention more specifically.

EXAMPLE 1

In each run, $BaTiO_3$ having a purity of more than 98.5% synthesized in advance from equimolar proportions of $BaCO_3$ and $TiO_2$ at 1200° C., $Nd_2O_3$ having a purity of more than 98%, titanium dioxide (anatase-type) having a purity of more than 99.5%, $Bi_2O_3$ having a purity of more than 95% and $Pb_3O_4$ having a purity of more than 95% were weighed in the proportions indicated in Table 1 in the column of "main components", and the total weight of these components was adjusted to 500 g. Furthermore, $B_2O_3$, $SiO_2$ and ZnO each having a purity of more than 95% were weighed in the proportions indicated in the column of "subsidiary components", and added to the main components. The mixture was put in a 1.6-liter ceramic pot together with alumina balls (17 mm in diameter) having a bulk volume of 0.8 liter (1.5 kg). Furthermore, a dispersant, an antifoamer, an organic binder, a plasticizer and toluene as a dispersing medium were added. The mixture was processed by rotating the pot at a speed of 72 rpm for 24 hours. The resulting slip was formed into green sheets each having a thickness of 25 micrometers by a doctor blade method. Twenty-five such green sheets were stacked, and hot-pressed to form a green plate, and cut into a square plate each side measuring about 10 mm and having a thickness of about 0.50 mm. The green plate was fired at 1000° to 1100° C. for 2 hours. Silver electrodes were attached to all over the upper and lower surfaces of the resulting square plate, about 8 mm long in each side and 0.4 mm thick, to form a single layer square plate capacitor for use as an evaluating sample. The electrostatic capacity and quality factor (Q value) of the sample were measured at a frequency of 1 MHz and an input voltage level of 1 V rms. Its insulation resistance (IR) was measured by applying a dc voltage of 50 V for 1 minute, and thereafter, its electrostatic capacity temperature coefficient was measured at a frequency of 1 MHz at $-55°$ C. and $+125°$ C. Furthermore, the length (L) and width (W) of the sample were measured at an accuracy of $\pm 5$ micrometers, and its thickness (t) was measured at an accuracy of $\pm 1$ micrometer. The dielectric constant $\epsilon_r$ of the sample was then calculated in accordance with the following equation.

$$\epsilon_r = (1/\epsilon_0) \cdot (C \cdot t / L \cdot W) \quad (\epsilon_0 = 8.865 \times 10^{-3} \text{ PF/mm})$$

The results of measurement or calculation of these electrical properties are summarized in Table 1 together with the chemical compositions and firing temperatures of the samples.

capacitors comprising a single layer of fired ceramics and a silver electrode were used to evaluate the various properties. When a laminate of such single layer capacitors is fired, the firing temperature becomes about 20° C. lower. It has been confirmed that when the temperature coefficient of capacity (ppm/°C.) is large on the minus side, it shifts to the plus side by about 15 ppm/°C. in the multilayer capacitor because of the lower firing temperature. The temperature coefficient of capacity of sample No. 13 is $-45$ ppm/°C. at $-55°$ C. and $-37$ ppm/°C., which are seemingly outside the range of $\pm 30$ ppm/°C. specified in the present invention. It will be understood however from the foregoing that in the form of a laminated capacitor, the capacity temperature coefficient will fall within the range specified in this invention.

All of the above samples within the scope of this invention were fully sintered at firing temperatures of not more than 1050° C., and showed excellent electrical properties represented by an insulation resistance (IR) of at least $10^6$ MΩ, a dielectric constant ($\epsilon_r$) of as high as at least 50 (the lowest one is 68 for sample No. 11) and a quality factor (Q value) of at least 1000. It is also been

TABLE 1

| Sample No. | Main Component (% by weight) | | | | | Subsidiary Components (% by weight) | | | Firing Temperature (°C.) | Electrical Properties | | | Capacity Temperature Coefficient (ppm/°C.) | |
|---|---|---|---|---|---|---|---|---|---|---|---|---|---|---|
| | BaTiO$_3$ | Nd$_2$O$_3$ | TiO$_2$ | Bi$_2$O$_3$ | Pb$_3$O$_4$ | B$_2$O$_3$ | SiO$_2$ | ZnO | | $\epsilon_r$ | Q | IR (MΩ) | $-55°$ C. | $+125°$ C. |
| 1* | 24.0 | 33.5 | 29.0 | 7.50 | 6.00 | (0) | (0) | (0) | 1270 | 83 | 2100 | >10$^6$ | +10 | +2 |
| 2* | (12.0) | (38.8) | (8.68) | 6.95 | | 0.50 | 2.50 | 2.50 | 1100 | 58 | 1830 | >10$^6$ | -13 | -13 |
| 3* | (15.0) | (37.5) | 32.4 | (8.39) | 6.71 | " | " | " | 1100 | 62 | 2100 | >10$^6$ | -2 | -5 |
| 4 | 18.0 | 36.1 | 31.3 | 8.09 | 6.47 | " | " | " | 1050 | 70 | 2130 | >10$^6$ | +5 | +5 |
| 5 | 21.0 | 34.8 | 30.1 | 7.80 | 6.34 | " | " | " | 1050 | 76 | 2170 | >10$^6$ | +12 | +10 |
| 6 | 24.0 | 33.5 | 29.0 | 7.50 | 6.00 | " | " | " | 1000 | 85 | 2600 | >10$^6$ | +7 | -3 |
| 7* | (30.0) | (30.9) | (26.7) | 6.91 | (5.53) | " | " | " | 1100 | 58 | 1400 | 4 × 10$^4$ | -109 | -105 |
| 8 | 24.4 | 35.1 | 29.4 | 5.08 | 6.09 | " | " | " | 1000 | 72 | 2400 | >10$^6$ | +1 | +3 |
| 9* | 23.4 | (37.5) | 28.3 | 4.89 | 5.86 | " | " | " | 1050 | 74 | 2200 | >10$^6$ | +50 | +55 |
| 10 | 22.6 | 31.6 | 35.5 | 4.71 | 5.64 | " | " | " | 1050 | 68 | 2700 | >10$^6$ | -21 | -18 |
| 11* | 22.0 | (30.7) | (37.2) | 4.58 | 5.49 | " | " | " | 1100 | 55 | 650 | 1 × 10$^4$ | -45 | -50 |
| 12* | 25.4 | 35.5 | 30.7 | (2.07) | 6.35 | " | " | " | 1100 | 71 | 120 | 5 × 10$^3$ | -80 | -88 |
| 13 | 25.3 | 35.3 | 30.5 | 2.63 | 6.32 | " | " | " | 1050 | 69 | 2330 | >10$^6$ | -45 | -37 |
| 14 | 24.6 | 34.4 | 29.7 | 5.13 | 6.15 | " | " | " | 1000 | 78 | 2300 | >10$^6$ | -3 | +4 |
| 15* | 23.4 | 32.7 | 28.3 | (9.76) | 5.85 | " | " | " | 1050 | 67 | 1670 | 3 × 10$^4$ | -30 | -43 |
| 16* | 22.9 | 31.9 | 27.6 | (11.90) | 5.71 | " | " | " | 1050 | 60 | 1510 | 1 × 10$^4$ | -60 | -70 |
| 17* | 24.6 | 34.4 | 29.7 | 5.13 | 6.15 | (0) | 2.5 | 2.5 | 1100 | 80 | 1200 | 5 × 10$^4$ | -28 | -30 |
| 18 | " | " | " | " | " | 0.1 | 2.5 | 2.5 | 1050 | 77 | 2000 | >10$^6$ | -19 | -15 |
| 19 | " | " | " | " | " | 0.9 | 2.5 | 2.5 | 1030 | 74 | 2100 | >10$^6$ | -5 | -8 |
| 20 | " | " | " | " | " | 1.3 | " | " | 1050 | 76 | 2300 | >10$^6$ | -18 | -27 |
| 21* | " | " | " | " | " | 0.5 | (0) | 2.5 | 1100 | 61 | 490 | 7 × 10$^3$ | -30 | -37 |
| 22* | " | " | " | " | " | 0.5 | (0.5) | 2.5 | 1100 | 75 | 1000 | 1 × 10$^4$ | -25 | -22 |
| 23 | " | " | " | " | " | 0.5 | 1.0 | 2.5 | 1050 | 72 | 1900 | >10$^6$ | -28 | -19 |
| 24 | " | " | " | " | " | 0.5 | 3.0 | 2.5 | 1000 | 75 | 2600 | >10$^6$ | -10 | -5 |
| 25* | " | " | " | " | " | 0.5 | (5.0) | 2.5 | 1100 | 58 | 600 | 5 × 10$^3$ | -45 | -50 |
| 26* | " | " | " | " | " | 0.5 | 2.5 | (0) | 1100 | 73 | 900 | 1 × 10$^4$ | -19 | -14 |
| 27 | " | " | " | " | " | 0.5 | 2.5 | 0.5 | 1050 | 80 | 2900 | >10$^6$ | -15 | -18 |
| 28 | " | " | " | " | " | 0.5 | 2.5 | 3.0 | 1000 | 71 | 2300 | >10$^6$ | +10 | +8 |
| 29* | " | " | " | " | " | 0.5 | 2.5 | (5.0) | 1000 | 55 | 750 | >10$^6$ | +40 | +33 |
| 30 | 24.0 | 33.5 | 29.0 | 7.50 | 6.00 | 0.5 | 3.0 | 2.5 | 1050 | 73 | 2500 | >10$^6$ | -5 | -8 |
| 31 | 23.3 | 31.6 | 31.1 | 6.25 | 9.00 | " | " | " | 1050 | 74 | 2300 | >10$^6$ | +7 | +1 |

1. The asterisks indicate samples outside the scope of the invention.
2. The parenthesized figures are outside the scope of the invention.

Samples 1, 2, 3, 7, 11, 12, 17, 21, 22, 25 and 26 fall outside the composition range specified in this invention, and require firing temperatures of at least 1100° C. Samples Nos. 11, 12, 21, 26 and 29 have a quality factor (Q value) of as low as less than 1000, and do not meet the object of this invention. Samples Nos. 7, 11, 12, 15, 16, 17, 21, 22, 25 and 26 have too low an insulation resistance (IR), and do not meet the object of this invention. Samples Nos. 7, 9, 11, 12, 16, 25 and 29 have a temperature coefficient of capacity outside the range of ($\pm$) 30 ppm/°C., and do not meet the object of this invention. In these examples, the single layer ceramic that they have definite temperature characteristics as shown by their electrostatic capacity temperature coefficient (ppm/°C.) of $\pm 30$ ppm/°C.

EXAMPLE 2

A paste composed of an alloy of 70% by weight of Ag and 30% by weight of Pd, an organic binder and a solvent for it was printed on a green dielectric sheet of each of sample No. 14 shown in Table 1 containing B$_2$O$_3$ and sample No. 17 shown in Table 1 not containing $B_2O_3$. Fifty-eight such green sheets having printed metal films were stacked and 8 such green sheets having no printed film were further laid over each of the top and the bottom of the assembly. The entire assembly was hot-pressed, and then cut into pieces each having a length of 5.2 mm and a width of 4 mm to prepare green chips of a laminated ceramic capacitor. The green chips were fired for 2 hours at each of the temperatures shown in Table 1. An Ag-Pd alloy electrode was attached to both ends of the two types of chip to construct laminated ceramic capacitors.

The electrostatic capacities (nF) and quality factor (Q values) of the resulting multilayer ceramic capacitors were measured at a frequency of 1 MHz and an input voltage for 1 V rms. A dc voltage of 50 V was applied for 1 minute, and their insulating resistances (IR) were measured. Furthermore, a dc voltage was applied and gradually elevated. The voltage (breakdown voltage) at which each of the capacitors broke down was measured. The results are shown in Table 2. The number of measuring samples was 20 in each run. The electrostatic capacity (nF) and quality factor (Q value) are shown by average values. The dielectric voltage is shown by average values $\bar{x}$ and variation indices $\delta/\bar{x}$ (%). The insulation resistance (IR) is shown by the number of samples having an IR on the order of $10^6$, $10^5$, and $10^4$ M$\Omega$.

TABLE 2

| Sample No. in Table 1 | $B_2O_3$ (wt. %) | Electro static capacity (nF) | Quality Factor (Q value) | IR (M$\Omega$) | | | Dielectric Voltage | |
|---|---|---|---|---|---|---|---|---|
| | | | | $10^6$ | $10^5$ | $10^4$ | $\bar{x}$ (V) | $\delta/\bar{x}$ (%) |
| 17 | 0 | 25.964 | 3060 | 12/20 | 7/20 | 1/20 | 321 | 22.4 |
| 14 | 0.5 | 24.595 | 3680 | 20/20 | 0/20 | 0/20 | 741 | 10.4 |

As shown in Table 2, the laminated ceramic capacitor for sample No. 17 not containing $B_2O_3$ has an average breakdown voltage of 321 $\bar{x}$ (V) and a variation index of $\bar{x}$ of 22.4/$\bar{x}$ (%), and an insufficient insulation resistance shown by one sample having an IR on the order of $10^5$ M$\Omega$ out of 20, and 7 samples having an IR on the order of $10^5$ M$\Omega$ out of 20. In contrast, the laminated ceramic capacitor of sample No. 14 containing $B_2O_3$ has an average breakdown voltage, $\bar{x}$, of 741 V which is more than 2 times that of the former, and a sufficient insulation resistance (IR) as shown by the fact that all 20 samples had an insulation resistance of more than $10^6$ M$\Omega$.

As stated in detail hereinabove even when heated at 1050° C. or lower, the composition of this invention shows good electrical properties and electrostatic capacity temperature characteristics as a ceramic capacitor having a high dielectric constant which are substantially the same as those obtained at higher firing temperatures. Hence, a relatively low-melting Pd-Ag alloy having a major proportion of Ag can be used as an internal electrode, a multilayer ceramic capacitor of a low price can be produced. Furthermore, the capacitor obtained has a high breakdown voltage and its variations can be reduced.

What is claimed is:

1. A dielectric ceramic composition prepared by adding 0.1 to 1.3% by weight of $B_2O_3$, 1.0 to 3.0% by weight of $SiO_2$ and 0.5 to 3.0% by weight of ZnO to a major proportion of a composition comprising 18.0 to 27.0% by weight of $BaTiO_3$, 31.6 to 36.3% by weight of $Nd_2O_3$, 27.6 to 35.5% by weight of $TiO_2$, 2.5 to 8.1% by weight of $Bi_2O_3$ and 5.6 to 9.0% by weight of $Pb_3O_4$.

2. The composition of claim 1 wherein 0.3 to 0.9% by weight of $B_2O_3$, 1.5 to 2.5% by weight of $SiO_2$ and 1.0 to 2.5% by weight of ZnO are added.

3. A multilayer ceramic capacitor comprising
   (a) a laminated monolithic structure obtained by preparing a plurality of units each consisting of a thin layer of a dielectric ceramic composition and a thin layer of a metal paste formed as an internal electrode on the surface of the ceramic layer so that it reaches one end of the ceramic layer but does not reach the other end, stacking the units so that the metal pastereaching ends of the ceramic layers and the other ends are each alternately situated on the same side, pressbonding them, and sintering the entire assembly, and
   (b) external electrodes provided on both sides of the laminated structure;
   wherein
   said dielectric ceramic composition is a dielectric ceramic composition prepared by adding 0.1 to 1.3% by weight of $B_2O_3$, 1.0 to 3.0% by weight of $SiO_2$ and 0.5 to 3.0% by weight of ZnO to a major proportion of a composition comprising 18.0 to 27.0% by weight of $BaTiO_3$, 31.6 to 36.3% by weight of $Nd_2O_3$, 27.6 to 35.5% of $TiO_2$, 2.5 to 8.1% by weight of $Bi_2O_3$ and 5.6 to 9.0% by weight of $Pb_3O_4$, and
   the internal electrode is made of a silver-palladium alloy in which silver is present in a major amount.

4. The capacitor of claim 3 wherein the silver-palladium alloy contains 51 to 90% by weight of silver and 10 to 40% by weight of palladium.

5. The capacitor of claim 3 wherein the laminated assembly is sintered at a firing temperature of 1000° to 1050° C.

* * * * *